(12) United States Patent
Nakajima et al.

(10) Patent No.: US 11,878,645 B2
(45) Date of Patent: Jan. 23, 2024

(54) KNEE AIRBAG DEVICE

(71) Applicant: Autoliv Development AB, Vargarda (SE)

(72) Inventors: Yutaka Nakajima, Kasumigaura (JP); Takanari Muroya, Kasumigaura (JP); Ryota Ishigaki, Kasumigaura (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/649,748

(22) Filed: Feb. 2, 2022

(65) Prior Publication Data

US 2022/0242354 A1    Aug. 4, 2022

(30) Foreign Application Priority Data

Feb. 2, 2021  (JP) .................................. 2021-015348
Dec. 9, 2021  (JP) .................................. 2021-199847

(51) Int. Cl.
| B60R 21/206 | (2011.01) |
| B60R 21/233 | (2006.01) |
| B60R 21/2338 | (2011.01) |
| B60R 21/231 | (2011.01) |
| B60R 21/20 | (2011.01) |
| B60R 21/00 | (2006.01) |

(52) U.S. Cl.
CPC ............ B60R 21/20 (2013.01); B60R 21/206 (2013.01); B60R 21/231 (2013.01); B60R 21/233 (2013.01); *B60R 2021/0051* (2013.01); *B60R 2021/23169* (2013.01); *B60R 2021/23308* (2013.01); *B60R 2021/23324* (2013.01); *B60R 2021/23382* (2013.01)

(58) Field of Classification Search
CPC ..... B60R 21/206; B60R 21/20; B60R 21/233; B60R 21/2338; B60R 21/231; B60R 21/205; B60R 2021/23169; B60R 2021/0051; B60R 2021/23324; B60R 2021/23308; B60R 2021/23316; B60R 2021/23382; B60R 2021/2338; B60R 2021/0053
USPC .... 280/730.1, 732, 743.2, 729, 743.1, 728.2
See application file for complete search history.

(56) References Cited

U.S. PATENT DOCUMENTS

2008/0023950 A1* 1/2008 Kalczynski ........... B60R 21/239
                                                                280/739
2015/0115579 A1   4/2015 Abramoski et al.
(Continued)

FOREIGN PATENT DOCUMENTS

| JP | 2008-184149 A | 8/2008 |
| JP | 2015-131524 | 7/2015 |
| JP | 2019-034697 | 3/2019 |

*Primary Examiner* — Keith J Frisby
(74) *Attorney, Agent, or Firm* — Foley & Lardner LLP

(57) ABSTRACT

A knee airbag device according to the present invention includes: an airbag that restrains a lower extremity of an occupant by expanding and deploying below an instrument panel of a vehicle; and an inflator that supplies expansion gas to the airbag. The airbag includes, when the inside of the vehicle is a first side and the outside of the vehicle is a second side, a first portion positioned on the first side and a second portion positioned on the second side. Furthermore, the first portion of the airbag protrudes more toward the occupant side than the second portion.

14 Claims, 7 Drawing Sheets

(56) References Cited

U.S. PATENT DOCUMENTS

| | | | |
|---|---|---|---|
| 2015/0197210 A1* | 7/2015 | Abe | B60R 21/206 |
| | | | 280/729 |
| 2019/0054883 A1* | 2/2019 | Kitagawa | B60R 21/231 |
| 2020/0247349 A1* | 8/2020 | Malapati | B60R 21/2644 |

* cited by examiner

[FIG. 1]
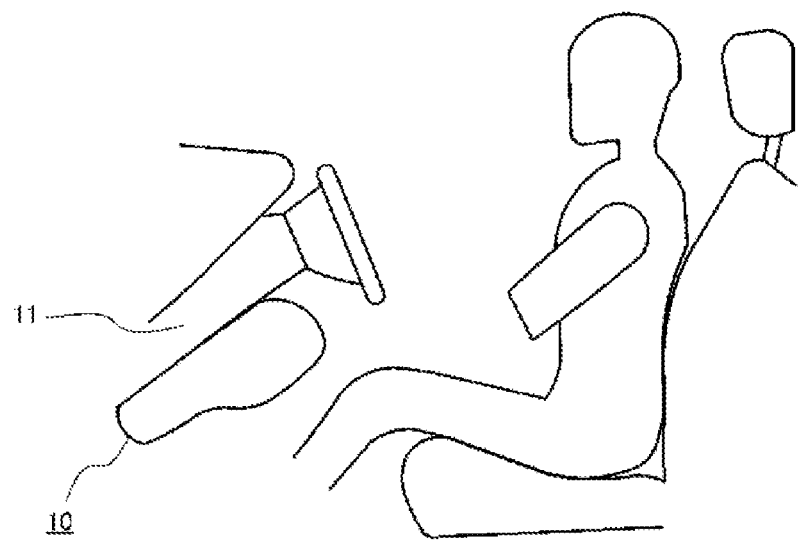
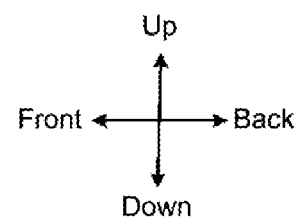

[FIG. 2A]
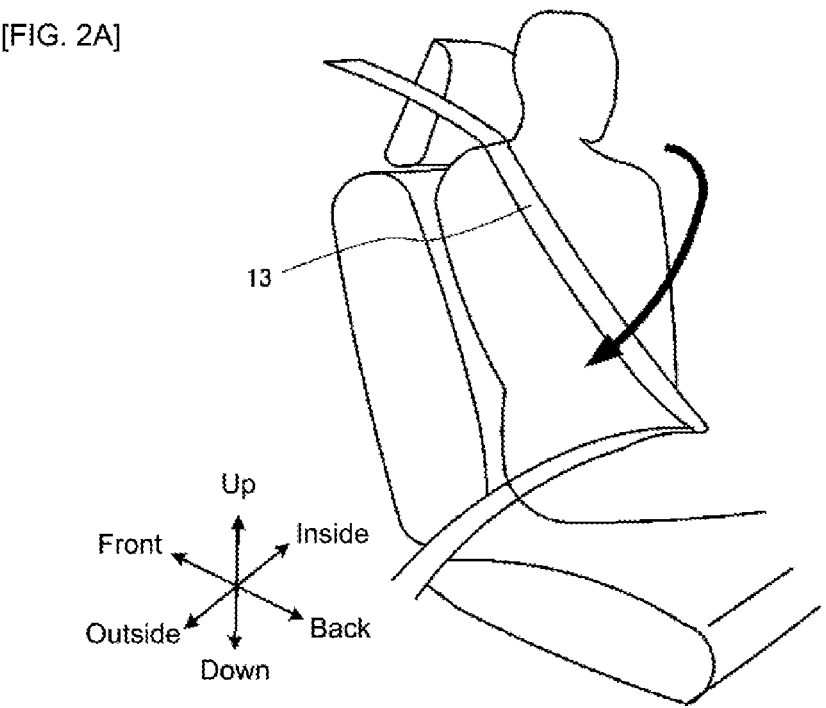
[FIG. 2B]
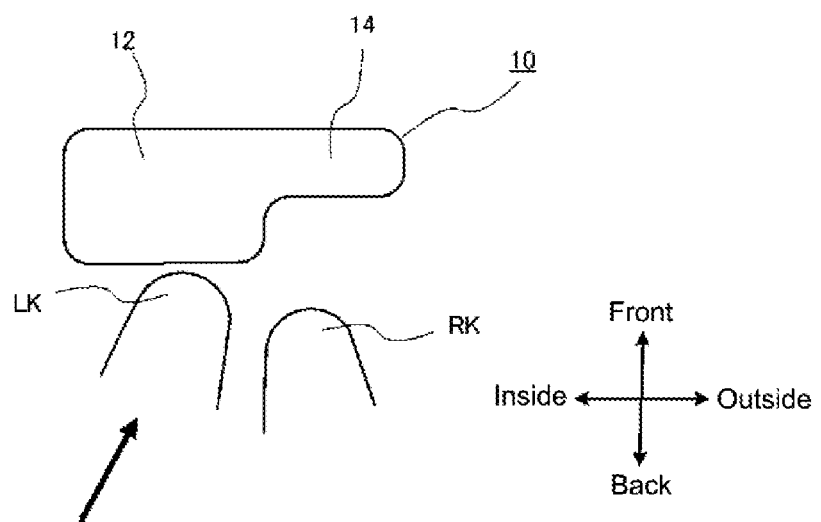

[FIG. 3]
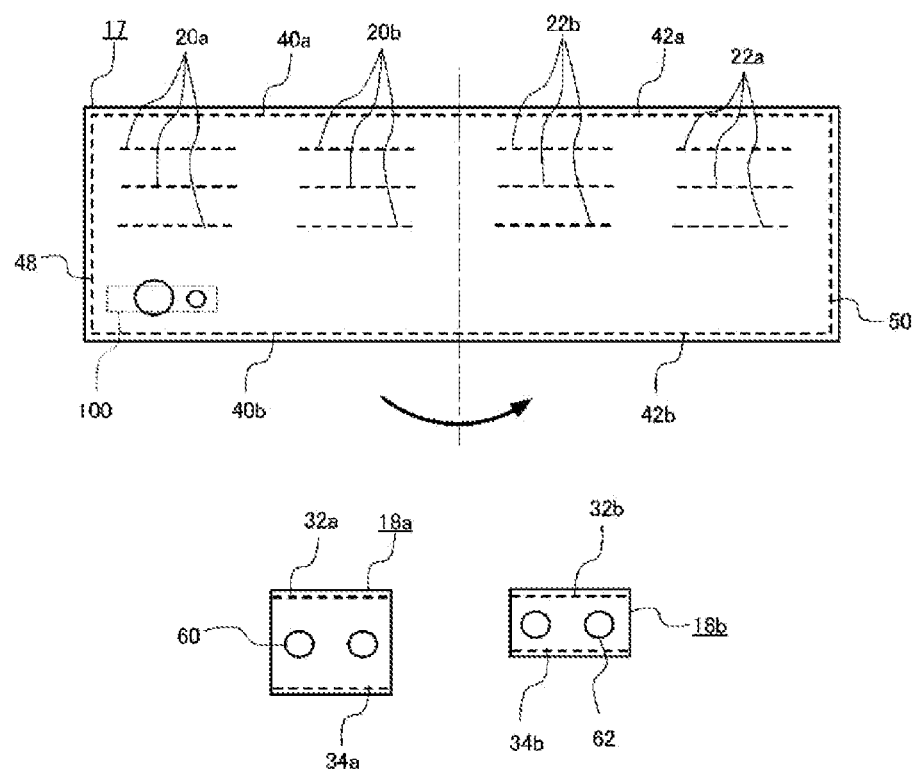

[FIG. 4A]
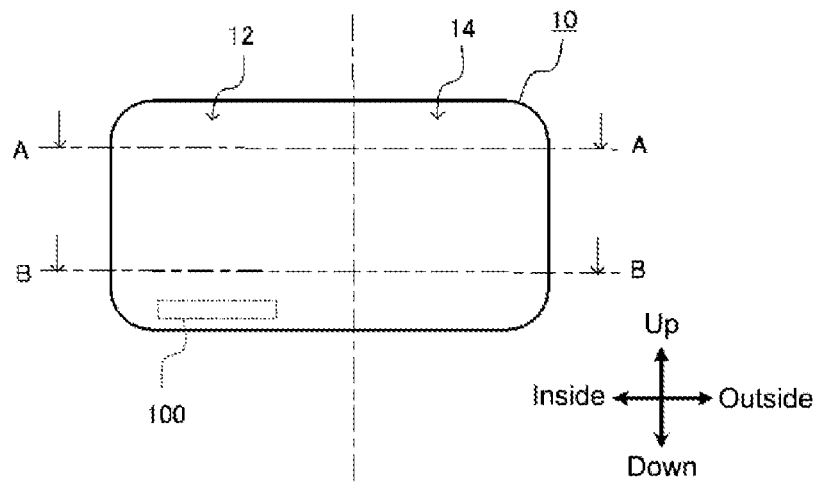
[FIG. 4B]
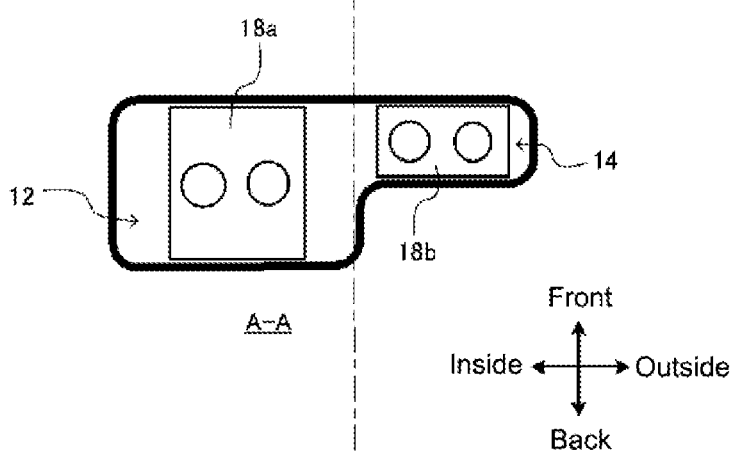
[FIG. 4C]
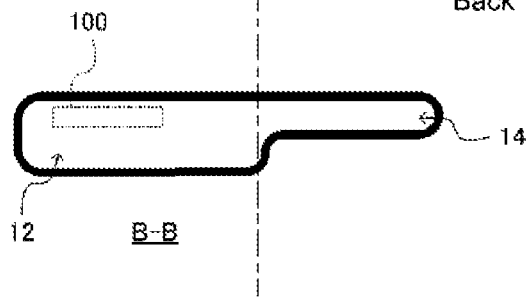

[FIG. 5]
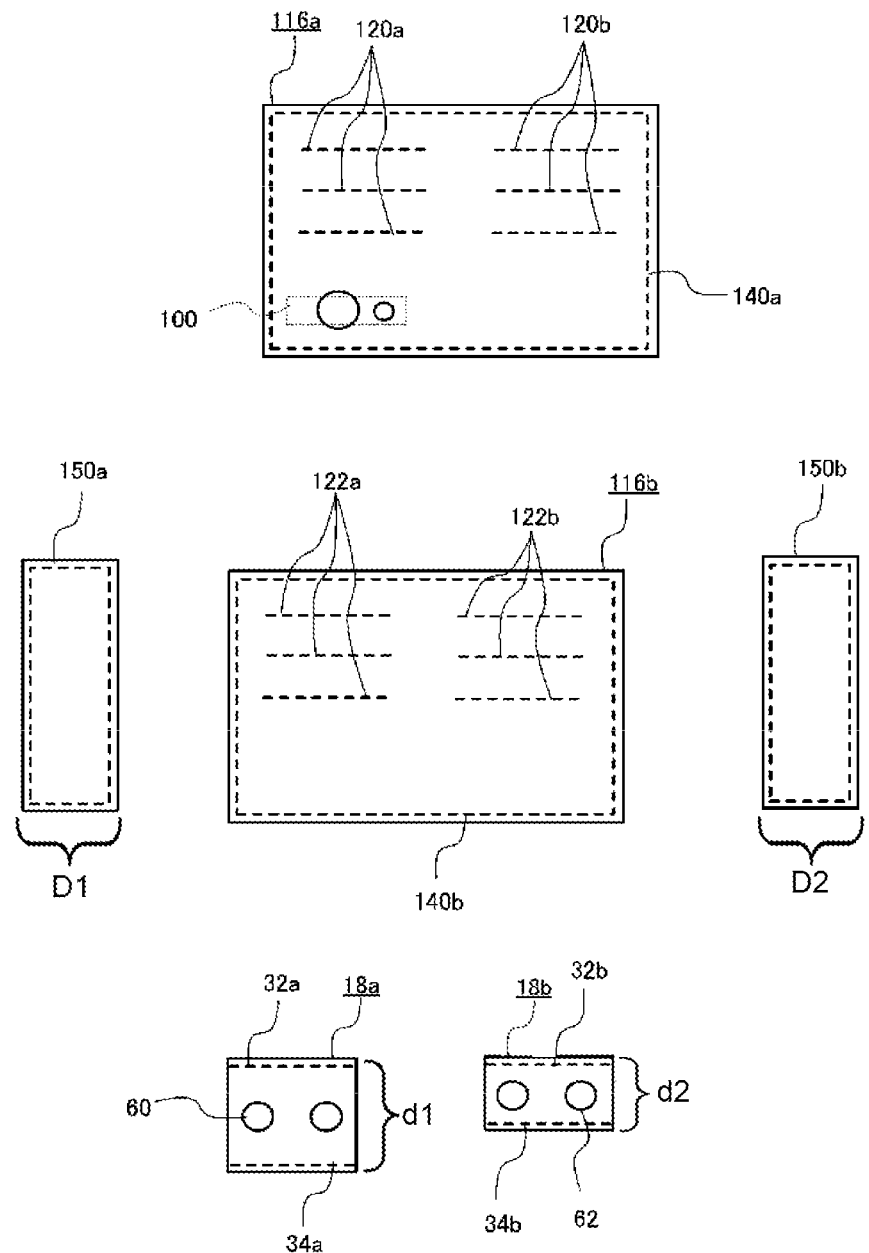

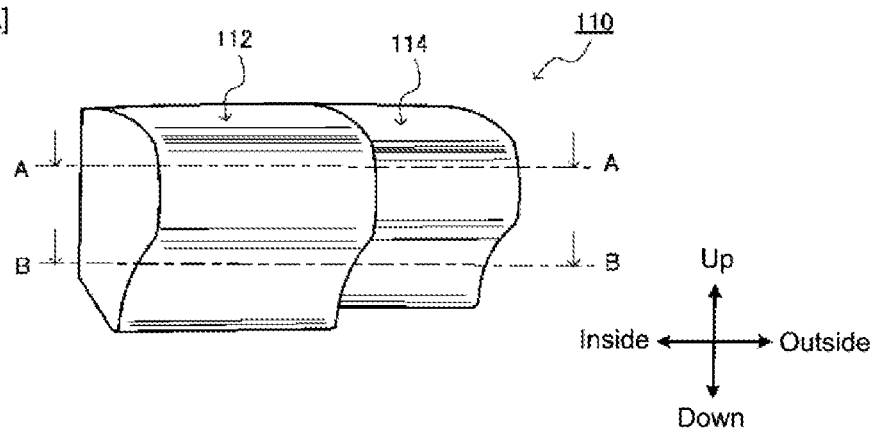
[FIG. 6A]
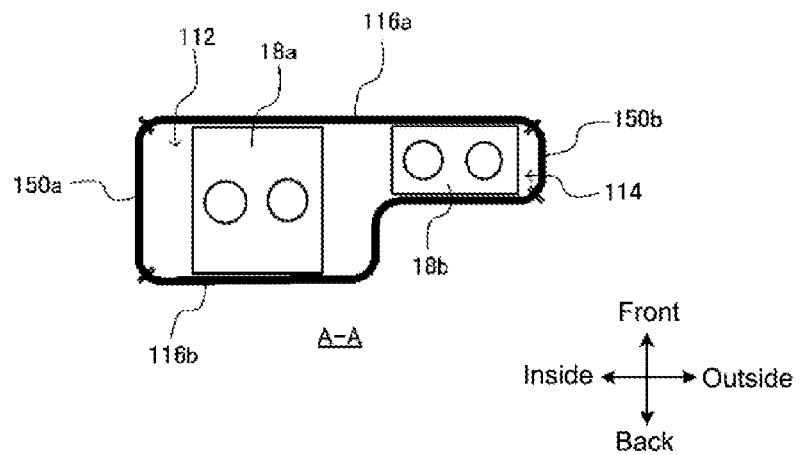
[FIG. 6B]
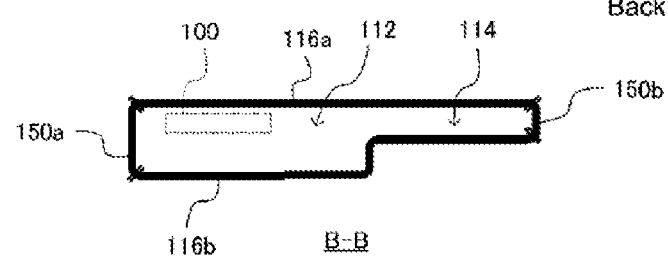
[FIG. 6C]

[FIG. 7]
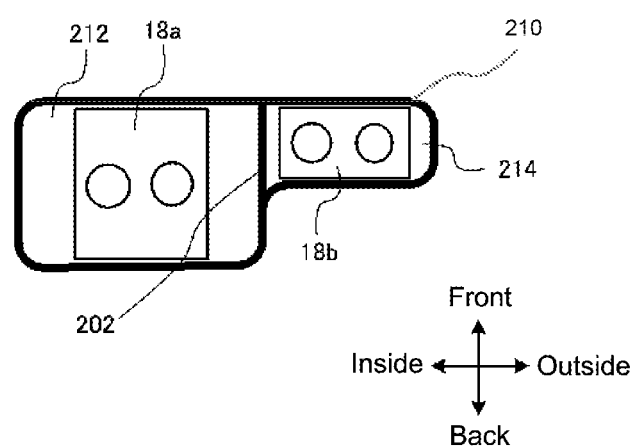

KNEE AIRBAG DEVICE

CROSS-REFERENCE TO RELATED APPLICATIONS

This application claims priority pursuant to 35 U.S.C. 119(a) to Japan Patent Application No. 2021-015348, filed Feb. 2, 2021, and Japan Patent Application No. 2021-199847, filed Dec. 9, 2021, which applications are incorporated herein by reference in their entirety.

TECHNICAL FIELD

The present invention relates to a knee airbag device that deploys in an area of the leg for a front seat of a vehicle.

BACKGROUND TECHNOLOGY

Providing a vehicle with one or a plurality of airbag devices in order to protect an occupant therein in the event of a vehicle accident is well known. Airbag devices include various forms such as: so-called driver airbag devices that deploy from the vicinity of the center of a steering wheel to protect a driver; curtain airbag devices that deploy in a downward direction on an inner side of a window of an automobile to protect an occupant in the event of an impact in a lateral direction of a vehicle, a rollover, or an overturning accident; side airbag devices that deploy on a side portion of an occupant (side portion of a seat) to protect the occupant in the event of an impact in a lateral direction of a vehicle; knee airbag devices that deploy in the leg area of an occupant in a front seat; and the like. The present invention relates to a knee airbag device.

For passive safety in vehicles, it is important to restrain movement of an occupant by a seat belt. In general, a three-point seat belt for a front seat extends diagonally (diagonal direction) from an upper portion of a B pillar to the waist of an occupant, and the seat belt does not cover the shoulder on an inner side of the vehicle. Therefore, in the event of an oblique or offset collision, the shoulder of the occupant on the inner side of the vehicle (center or far-side) moves forward or rotates to an outer side. Furthermore, following the rotation of the upper body of the occupant, the torso of the occupant rotates in a direction that is directly opposite of the outer side of the vehicle (near side), and the outer shoulder of the occupant, which is restrained by the seat belt, rotates in a direction that causes the occupant to slip out of the seat belt. Thus, the restraining performance of the occupant by the seat belt will be reduced.

SUMMARY OF THE INVENTION

Problem to be Solved by the Invention

In view of the foregoing, an object of the present invention is to provide a knee airbag device that can quickly and reliably restrain a lower extremity of an occupant, and thereby can suppress degradation of restraining performance of the occupant by a seat belt.

Means for Solving the Problems

In order to achieve the aforementioned object, a knee airbag device according to the present invention includes: an airbag that restrains a lower extremity of an occupant by expanding and deploying below an instrument panel of a vehicle; and an inflator that supplies expansion gas to the airbag. The airbag includes, when the inside of the vehicle is a first side and the outside of the vehicle is a second side, a first portion positioned on the first side and a second portion positioned on the second side. Furthermore, the first portion of the airbag protrudes more toward the occupant side than the second portion.

Alternatively, a knee airbag device according to the present invention includes: an airbag that restrains a lower extremity of an occupant by expanding and deploying below an instrument panel of a vehicle toward the occupant wearing a seat belt in the vehicle; and an inflator that supplies expansion gas to the airbag. The seat belt extends diagonally from a top of a shoulder on one side of the occupant to the waist on the other side of the occupant. The airbag includes, when the other side is a first side and the one side is a second side, a first portion positioned on the first side and a second portion positioned on the second side. Furthermore, the first portion of the airbag protrudes more toward the occupant side than the second portion.

Herein, "inner side of the vehicle" can be expressed as a center console side or the far side of the vehicle. Furthermore, "outer side of the vehicle" can be expressed as a door side of the vehicle or the near side.

Normally, in the event of an oblique or offset collision of a vehicle, the shoulder of the occupant on the inner side (far side) of the vehicle moves forward or rotates to the outer side, and the torso portion of the occupant rotates in a direction directly opposite from the outer side (near side) of the vehicle in accordance therewith. In this case, the outer side shoulder of the occupant restrained by a seat belt will rotate in a direction of slipping out of the seat belt. However, by applying the knee airbag device according to the present invention, the first portion of the airbag, which is positioned on the inner side of the vehicle, protrudes and deploys more toward the occupant than the second portion, which is positioned on the outer side of the vehicle, such that a lower extremity (knee) of the occupant on the inner side of the vehicle first contacts with the first portion, thereby suppressing rotation of the lower body of the occupant. As a result, the lower extremity of the occupant can be quickly restrained. Furthermore, by suppressing the rotation of the lower body of the occupant, the rotation of the upper body of the occupant is also suppressed, thereby enabling the restraining performance of the occupant by the seat belt to be maintained.

The knee airbag device according to the present invention can protect an occupant seated in a front seat of a vehicle, such as a driver's seat, a front passenger's seat, or the like.

The thickness of the airbag in a vehicle front-rear direction can be set to be greater in the first portion than in the second portion.

Note that the thickness of the first and second portions of the airbag can be the same. In this case, it is necessary to devise a shape of the airbag, a deployment direction, a supporting structure on the first side of the airbag, and the like.

The airbag can have a first surface facing the occupant side and a second surface facing the instrument panel side, and first and second baffle plates having different widths in the front-rear direction can be connected between the first and second surfaces inside the airbag.

The baffle plate can be molded, for example, by a fabric of the same material as the airbag and can be connected to the airbag by sewing.

The first baffle plate can be configured to regulate the thickness of the first portion of the airbag in the front-rear direction, and the second baffle plate can be configured to regulate the thickness of the second portion of the airbag in the front-rear direction.

Vent holes can be formed in the first and second baffle plates, and the expansion gas can flow in an up-down direction inside the airbag through the vent holes.

The first and second baffle plates can be provided only in the upper portion of the airbag and not in the lower portion. With regard to a line extending horizontally from the center in the up-down direction of the airbag in the deployed state, the upper side can be referred to as the "upper portion" and the lower side can be referred to as the "lower portion".

Normally, a knee is a most forward part of the body of an occupant seated in the seat, and therefore, the shape of the upper portion of the airbag, at a minimum, can be designed to properly restrain the occupant. From another perspective, by providing baffle plates only in the upper portion of the airbag, the amount (number and range) of baffle plates can be reduced to the minimum necessary, which contributes to lower manufacturing costs.

The inflator can be disposed inside the lower portion of the airbag.

By storing the inflator in the lower portion of the airbag, in which the baffle plate is not disposed, the inside of the airbag is quickly filled with expansion gas, which contributes to the rapid deployment of the airbag.

The inflator can be disposed on the first side of the airbag.

By arranging the inflator on the first side corresponding to the first portion of the airbag required to protrude significantly toward the occupant, the first portion can be expanded and deployed with a large capacity.

The first portion and the second portion of the airbag can be structures provided as separate chambers and connected to each other.

When provided as separate chambers inside the airbag, a connecting panel can be provided between the first portion and the second portion to partition a space between the two portions.

By providing the connecting panel, the first portion and the second portion can be clearly demarcated inside the airbag, and the deployment shape of the airbag can be easily changed and controlled between the first portion and the second portion.

The airbag can have a rear panel facing the occupant side, a front panel facing the instrument panel side, a first side panel connected to an edge part on a first side of the rear panel and the front panel, and a second side panel connected to an edge part on a second side of the rear panel and the front panel. Furthermore, the width of the first side panel in the front-rear direction can be greater than the width of the second side panel.

By forming the airbag with a front panel, a rear panel, and two side panels, the deployment shape of the airbag can be kept in a more three-dimensional manner. In other words, by adjusting the width of the side airbag, the thickness of the first and second portions of the airbag can be clearly distinguished.

The airbag can be a structure in which independent airbag cushions corresponding to the first portion and the second portion are provided and the airbag cushions are connected.

Note that in the present invention, when an occupant is seated in a seat in a normal posture, the direction the occupant faces is referred to as the "front," the opposite direction is referred to as the "rear," and the direction indicating the coordinate axis is referred to as the "front-rear direction." Moreover, when the occupant is seated in the seat in a regular posture, the right of the occupant is referred to as "right direction," the left of the occupant is referred to as "left direction," and the direction indicating the coordinate axis is referred to as the "left-right direction." Furthermore, when the occupant is seated in the seat in a regular posture, a head direction of the occupant is referred to as "up," a waist direction of the occupant is referred to as "down," and a direction indicating the coordinate axis is referred to as an "up-down direction." Furthermore, the center side of the vehicle is referred to as the "inner side" and a door panel side is referred to as the "outer side" in the left-right direction relative to the occupant.

BRIEF DESCRIPTION OF THE DRAWINGS

FIG. 1 is a side surface view illustrating an operating state of the knee airbag device according to the present invention and illustrates a state of the inside of a vehicle from a side.

FIG. 2(A) is a perspective view illustrating a state in which an occupant is seated in a vehicle seat and wearing a seat belt. FIG. 2(B) is a top surface view illustrating a deployed state of an airbag used in the knee airbag device according to the present invention.

FIG. 3 is a plan view illustrating a panel configuration of an airbag used in a knee airbag device according to Embodiment 1 of the present invention.

FIG. 4(A) is a schematic front surface view illustrating a deployed state of the airbag used in the knee airbag device according to Embodiment 1 of the present invention. FIGS. 4(B) and 4(C) are schematic cross-sectional views of FIG. 4(A) in a direction of A-A and a direction of B-B.

FIG. 5 is a plan view illustrating a panel configuration of an airbag used in a knee airbag device according to Embodiment 2 of the present invention.

FIG. 6(A) is a perspective view illustrating a deployed state of the airbag used in the knee airbag device according to Embodiment 2 of the present invention. FIGS. 6(B) and 6(C) are schematic cross-sectional views of FIG. 6(A) in a direction of A-A and a direction of B-B.

FIG. 7 is a cross-sectional view illustrating a deployed state of an airbag used in a knee airbag device according to Embodiment 3 of the present invention, and corresponds to direction A-A of FIG. 6(A).

DETAILED DESCRIPTION

Forms for implementing the present invention will be described in detail below based on embodiments. FIG. 1 is a side surface view illustrating an operating state of the knee airbag device 10 according to the present invention and illustrates a state of the inside of a vehicle from a side. FIG. 2(A) is a perspective view illustrating a state in which an occupant is seated in a vehicle seat and wearing a seat belt 13. FIG. 2(B) is a top surface view of the airbag 10 in a deployed state. The knee airbag device according to the present invention can protect an occupant seated in a front seat of a vehicle, such as a driver's seat, a front passenger's seat, or the like.

As illustrated in FIGS. 1 and 2, the knee airbag device according to the present invention includes: an airbag 10 that restrains a lower extremity of an occupant by expanding and deploying below an instrument panel 11 of a vehicle toward the occupant wearing a seat belt 13 in the vehicle; and an inflator 100 that supplies expansion gas to the airbag 10. The seat belt 13 extends diagonally downward from the top of a B-pillar (not illustrated) to a top of a shoulder of the occupant and then to the waist of the occupant.

The airbag 10 includes, when the inside of the vehicle is a first side and the outside of the vehicle is a second side, a first portion 12 positioned on the first side and a second portion 14 positioned on the second side. Furthermore, the first portion 12 protrudes more toward the occupant side (rearward) than the second portion 14.

Herein, "inner side of the vehicle" can be expressed as a center console side or the far side of the vehicle. Furthermore, "outer side of the vehicle" can be expressed as a door side of the vehicle or the near side. Note that in FIG. 2(A), the "first side" described above is the right side of the occupant and the "second side" is the left side.

As illustrated in FIG. 2(B), the thickness of the airbag 10 in a vehicle front-rear direction can be greater in the first portion 12 than in the second portion 14. Note that the first portion can be configured to protrude to the occupant side while keeping the thickness of the first portion 12 and the second portion 14 of the airbag 10 the same.

As illustrated in FIG. 2(A), in the event of an oblique or offset collision of a vehicle, the shoulder of the occupant on the inner side (far side) of the vehicle is generally inclined to move forward as indicated by the arrow or rotate to the outer side, and the torso portion of the occupant is inclined to rotate in a direction directly opposite from the outer side (near side) of the vehicle in accordance therewith. Furthermore, the outer side shoulder of the occupant restrained by a seat belt 13 is inclined to rotate in a direction of slipping out of the seat belt 13.

As illustrated by FIG. 2(B), with the knee airbag device according to the present invention, the first portion 12 of the airbag 10, which is positioned on the inner side of the vehicle, protrudes and deploys more toward the occupant than the second portion 14, which is positioned on the outer side of the vehicle, such that a lower extremity (knee) LK of the occupant on the inner side of the vehicle first contacts with the first portion 12. As a result, movement of the occupant about to slip out of the seat belt 13 can be suppressed, and the restraining performance of the occupant by the seat belt 13 can be maintained.

Embodiment 1

FIG. 3 is a plan view illustrating a panel configuration of an airbag 10 used in a knee airbag device according to Embodiment 1 of the present invention. FIG. 4(A) is a schematic front surface view illustrating a deployed state of the airbag 10 used in the knee airbag device according to Embodiment 1. FIGS. 4(B) and 4(C) are schematic cross-sectional views of FIG. 4(A) in a direction of A-A and a direction of B-B.

As illustrated in FIG. 3, the airbag 10 includes one large fabric main panel 17, three wide (depth) baffle plates 18a, and three narrow (depth) baffle plates 18b. The main panel 17 is folded back from the center and the perimeter is sewn to form a bag-shaped airbag 10. Specifically, lines 40a and 40b, 42a and 42b, and 48 and 50, respectively, on the main panel 17 are connected by sewing.

In FIG. 3, line 32a of the baffle plate 18a is sewn to line 20a of the main panel 17. Furthermore, line 34a of the baffle plate 18a is sewn to line 22a of the main panel 17. On the other hand, line 32b of the baffle plate 18b is sewn to line 20b of the main panel 17. Furthermore, line 34b of the baffle plate 18b is sewn to line 22b of the main panel 17.

As illustrated in FIG. 3, the baffle plates 18a, 18b of the airbag 10 are not provided in the lower portion of the airbag 10 (main panel 17) but only in the upper portion. Normally, a knee is a most forward part of the body of an occupant seated in the seat, and therefore, the shape of the upper portion of the airbag 10 can be adjusted to achieve an effect of the present invention. In other words, by applying such a configuration, the amount (number and range) of the baffle plates 18a, 18b can be reduced to the minimum necessary, which contributes to lower manufacturing costs.

The baffle plates 18a, 18b can, for example, be molded by a fabric of the same material as the main panel 17.

As illustrated in FIG. 4(B), the baffle plate 18a regulates the thickness of the first portion 12 of the airbag 10 in the front-rear direction, and the second baffle plate 18b regulates the thickness of the second portion 12 of the airbag 10 in the front-rear direction.

As illustrated in FIGS. 3 and 4(B), vent holes 60, 62 are formed in the baffle plates 18a, 18b, and expansion gas can flow in the up-down direction through the vent holes 60, 62 inside the airbag 10.

As illustrated in FIGS. 3, 4(A), and 4(C), the inflator 100 is stored on an inner side (first portion 12 side) of the lower portion of the airbag 10. By storing the inflator 100 in the lower portion of the airbag 10 in which the baffle plates 18a, 18b are not disposed, the inside of the airbag 10 is quickly filled with expansion gas, which contributes to the rapid deployment of the airbag 10. Furthermore, by arranging the inflator 100 on the first side corresponding to the first portion 12 of the airbag 10 required to protrude significantly toward the occupant, the first portion 12 can be expanded and deployed with a large capacity.

Embodiment 2

FIG. 5 is a plan view illustrating a panel configuration of an airbag 110 used in a knee airbag device according to Embodiment 2 of the present invention. FIG. 6(A) is a perspective view illustrating a deployed state of the airbag 110 used in the knee airbag device according to Embodiment 2. FIGS. 6(B) and 6(C) are schematic cross-sectional views of FIG. 6(A) in a direction of A-A and a direction of B-B. Note that duplicate descriptions are omitted for configurations identical or corresponding to Embodiment 1 described above.

As illustrated in FIG. 5, in the present embodiment, the airbag 110 includes a rear panel 116b facing the occupant side, a front panel 116a facing the instrument panel 11 side, a first side panel 150a connected to an edge part on a first side of the rear panel 116b and the front panel 116a, and a second side panel 150b connected to an edge part on a second side of the rear panel 116b and the front panel 116a.

Width D1 in the front-rear direction of the first side panel 150a is set to be generally equal to width d1 of the baffle plate 18a, and width D2 of the second side panel 150b is set to be generally equal to width d2 of the baffle plate 18b.

In FIG. 5, an outer edge 140a of the front panel 116a and an outer edge 140b of the rear panel 116b are connected by sewing through the side panels 150a, 150b. Furthermore, line 32a of the baffle plate 18a is sewn to line 120a of the front panel 116a. Furthermore, line 34a of the baffle plate 18a is sewn to line 122a of the rear panel 116b. On the other hand, the line 32b of the baffle plate 18b is sewn to the line 120b of the front panel 116a, and the line 34b of the baffle plate 18b is sewn to the line 122b of the rear panel 116b.

As illustrated in FIG. 5, in the present embodiment, the front panel 116a, the rear panel 116b, and the two side panels 150a, 150b form the airbag 110. Thereby, as illustrated in FIG. 6(A), the deployed shape of the airbag 110 can be kept in a more three-dimensional manner. In other words, the thickness of a first portion 112 and second portion 114 of the airbag 110 can easily be clearly distinguished.

Embodiment 3

FIG. 7 is a cross-sectional view illustrating a deployed state of an airbag 210 used in a knee airbag device according to Embodiment 3 of the present invention, and corresponds to direction A-A of FIG. 6(A).

In the present embodiment, a first portion 212 and a second portion 214 of the airbag 210 are configured as separate chambers. Inside the airbag 210, a connecting panel 202 is provided between the first portion 212 and the second portion 214 to partition a space between the two portions. A vent hole (not illustrated) that connects the first portion 212 and the second portion 214 is formed in the connecting panel 202.

By providing the connecting panel 202, the first portion 212 and the second portion 214 can be clearly demarcated inside the airbag 210, and the airbag 210 can easily be formed into a desired deployment shape.

Embodiments of the present invention have been described above. However, the present invention is in no way limited by these embodiments and may be changed within a scope of technical ideas set forth in the patent claims. For example, although not illustrated in the drawings, those corresponding to each of the chambers configured as separate chambers as described in FIG. 7 may be prepared as independent airbag cushions, which may be connected by sewing or the like. In this case, each airbag cushion may be provided with an inflator, and the ignition timing may be adjusted based on a collision form. Furthermore, one inflator may be provided with a gas inflow path leading to each airbag cushion, and an active vent may be provided in the gas inflow path to open and close the active vent at a predetermined timing based on the collision form.

The invention claimed is:

1. A knee airbag device, comprising:
an airbag configured to restrain a lower extremity of an occupant by expanding and deploying below an instrument panel of a vehicle; and
an inflator that supplies expansion gas to the airbag, wherein:
the airbag includes, when an inside of the vehicle is a first side and an outside of the vehicle is a second side, a first portion positioned toward the first side and a second portion positioned toward the second side,
the airbag further includes an upper portion and a lower portion, wherein the upper portion, during a deployed state, protrudes more toward an occupant side than the lower portion, and
the first portion of the airbag protrudes more toward an occupant side than the second portion, wherein an occupant side of the first portion is configured to contact a first knee of the occupant before an occupant side of the second portion contacts a second knee of the occupant to suppress rotation of the lower extremity of the occupant.

2. The knee airbag device according to claim 1, wherein the thickness of the airbag in a vehicle front-rear direction is greater in the first portion than in the second portion.

3. The knee airbag device according to claim 1, wherein the airbag has a first surface facing the occupant side and a second surface facing the instrument panel side, and first and second baffle plates having different widths in the front-rear direction are connected between the first and second surfaces inside the airbag.

4. The knee airbag device according to claim 3, wherein the first baffle plate regulates the thickness of the first portion of the airbag in the front-rear direction, and
the second baffle plate regulates the thickness of the second portion of the airbag in the front-rear direction.

5. The knee airbag device according to claim 3, wherein vent holes are formed in the first and second baffle plates, and the expansion gas can flow in an up-down direction inside the airbag through the vent holes.

6. The knee airbag device according to claim 3, wherein the first and second baffle plates are not provided in the lower portion of the airbag, but only in the upper portion of the airbag.

7. The knee airbag device according to claim 6, wherein the inflator is disposed inside the lower portion of the airbag.

8. The knee airbag device according to claim 7, wherein the inflator is disposed on the first side of the airbag.

9. The knee airbag device according to claim 1, wherein the first portion and the second portion of the airbag are provided as separate chambers and are connected to each other.

10. The knee airbag device according to claim 9, wherein inside the airbag, a connecting panel is provided between the first portion and the second portion to partition a space between the two portions.

11. The knee airbag device according to claim 1, wherein:
the airbag has a rear panel facing the occupant side and a front panel facing the instrument panel side,
a first side panel is connected to an edge part on a first side of the rear panel and the front panel, and
a second side panel is connected to an edge part on a second side of the rear panel and the front panel, and the width of the first side panel in the front-rear direction is greater than the width of the second side panel.

12. The knee airbag device according to claim 1, wherein the airbag is a structure in which independent airbag cushions corresponding to the first portion and the second portion are provided and the airbag cushions are connected.

13. A knee airbag device, comprising:
an airbag configured to restrain a lower extremity of an occupant by expanding and deploying below an instrument panel of a vehicle toward the occupant wearing a seat belt in the vehicle; and
an inflator that supplies expansion gas to the airbag, wherein:
the seat belt is configured to extend diagonally from a top of a shoulder on one side of the occupant to a waist on another side of the occupant,
the airbag includes, when the other side is a first side and the one side is a second side, a first portion positioned toward the first side and a second portion positioned toward the second side,
the airbag further includes an upper portion and a lower portion, wherein the upper portion, during a deployed state, protrudes more toward an occupant side than the lower portion, and
the first portion of the airbag protrudes more toward the occupant side than the second portion, wherein an occupant side of the first portion is configured to contact a first knee of the occupant before an occupant side of the second portion contacts a second knee of the occupant to suppress rotation of the lower extremity of the occupant.

14. A knee airbag device, comprising:
- an airbag configured to restrain a lower extremity of an occupant by expanding and deploying below an instrument panel of a vehicle; and
- an inflator that supplies expansion gas to the airbag, wherein:
    - the airbag includes, when an inside of the vehicle is a first side and an outside of the vehicle is a second side, a first portion positioned toward the first side and a second portion positioned toward the second side,
    - the airbag further includes an upper portion and a lower portion, wherein the upper portion, during a deployed state, protrudes more toward an occupant side than the lower portion, and
    - the first portion of the airbag protrudes more toward an occupant side than the second portion, wherein the inflator is disposed inside the lower portion of the airbag in the first portion on a first side of the lower portion towards a front of the vehicle, and wherein a width of the first portion along an axis between the first side and the second side is greater than a width of the second portion along the axis between the first side and the second side.

* * * * *